(12) United States Patent
Dieudonat et al.

(10) Patent No.: US 7,569,171 B2
(45) Date of Patent: Aug. 4, 2009

(54) OVERMOULDING OF RECEPTACLES WITH A THERMOPLASTIC MATERIAL AT A HIGH RATE OF PRODUCTION

(75) Inventors: Fabrice Dieudonat, Fosses (FR); Frédéric Milesi, Paris (FR)

(73) Assignee: Alcan Packaging Beauty Services, Chevilly-Larue (FR)

( * ) Notice: Subject to any disclaimer, the term of this patent is extended or adjusted under 35 U.S.C. 154(b) by 503 days.

(21) Appl. No.: 11/365,870

(22) Filed: Mar. 2, 2006

(65) Prior Publication Data

US 2006/0202388 A1  Sep. 14, 2006

(30) Foreign Application Priority Data

Mar. 8, 2005  (FR) .................................. 05 02309

(51) Int. Cl.
*B29C 45/14* (2006.01)
*B29C 70/72* (2006.01)
(52) U.S. Cl. .................... 264/275; 264/278; 264/328.7
(58) Field of Classification Search ................. 264/275, 264/328.7, 277, 278
See application file for complete search history.

(56) References Cited

U.S. PATENT DOCUMENTS

| 2,418,823 | A | * | 4/1947 | Desimone ..................... 249/94 |
| 2,465,799 | A | * | 3/1949 | Gravesen ..................... 264/254 |
| 3,311,690 | A |   | 3/1967 | Fischer |
| 3,347,965 | A | * | 10/1967 | Valyi ........................... 264/537 |
| 5,979,714 | A |   | 11/1999 | Bleile et al. |
| 7,276,199 | B2 | * | 10/2007 | Kraenzle .................. 264/328.7 |

FOREIGN PATENT DOCUMENTS

| DE | 17 29 357 | 7/1971 |
| FR | 2 631 581 | 11/1989 |
| JP | 50 040663 | 4/1975 |
| JP | 52 107052 | 9/1977 |

OTHER PUBLICATIONS

Dupont Packaging News: "Surlyn Gives Make-up Sticks a Glass-Like Shine and Excellent Scratch Resistance" Internet, Nov. 2003, XP002323435 *le document en entier*.

* cited by examiner

*Primary Examiner*—Jill L Heitbrink
(74) *Attorney, Agent, or Firm*—Young & Thompson

(57) ABSTRACT

An overmolding process for a hollow receptacle provided with a neck, and an axial body with a shoulder a sidewall and a bottom, the hollow receptacle, having axial height H and larger cross-section S. When the mould is open, the neck bears in contact with an axial support so as to mask the neck during the overmolding process. Before closing the mold, the sidewall is placed in a lateral positioning device that can be moved along an axial direction of the mold. After the mold has been closed, the lateral positioning device is displaced in the axial direction as the material flow injected into the axial cavity and forming an annular flow.

32 Claims, 15 Drawing Sheets

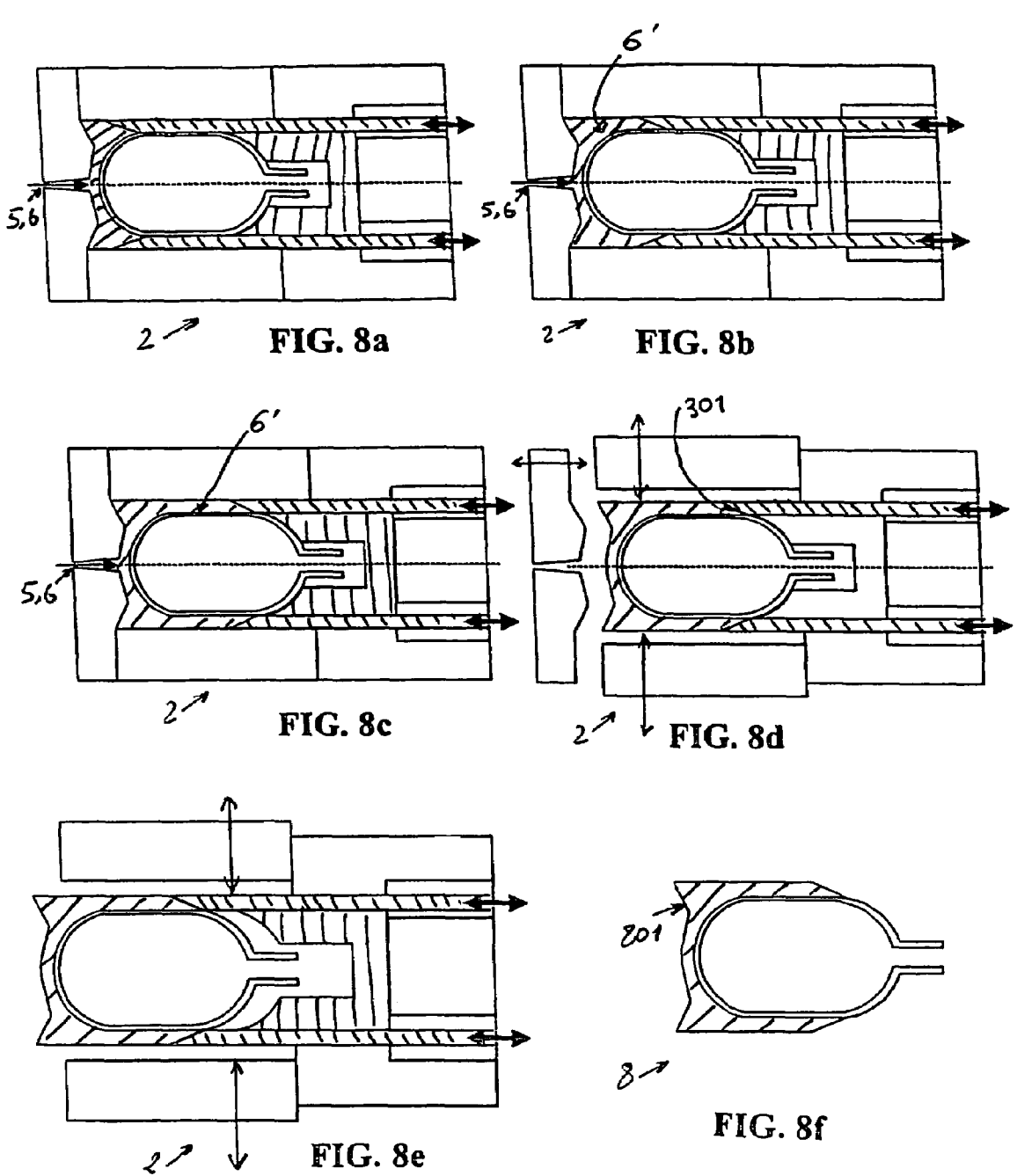

OVERMOULDING OF RECEPTACLES WITH A THERMOPLASTIC MATERIAL AT A HIGH RATE OF PRODUCTION

DOMAIN OF THE INVENTION

The invention relates to the domain of overmoulding of hollow receptacles. More specifically, it relates to a process and a device for overmoulding hollow receptacles.

STATE OF THE ART

The overmoulding technique for hollow receptacles is already known.

Thus, U.S. Pat. No. 2,981,984 describes a glass receptacle overmoulded with polystyrene.

Similarly, U.S. Pat. No. 3,663,259 describes a glass receptacle overmoulded with a transparent synthetic resin, for example polyester, the overmoulding being made using the conventional moulding method.

Similarly, the British patent 1 468 953 describes overmoulding of a metal receptacle designed to contain a pressurised fluid.

European patent EP 0 825 127 also describes a glass receptacle overmoulded with a plastic material.

Finally, European patent EP 1 395 496 also describes a glass or metal receptacle for a cosmetic product overmoulded with resin.

PROBLEMS THAT ARISE

Although in principle overmoulding of receptacles is already well known to those skilled in the art, problems still arise every time that it is necessary to overmould a fragile receptacle, typically made of a standard glass thickness, and secondly when it is required to obtain high precision and high speed overmoulding.

Based on information disclosed in prior part for overmoulding of standard thickness glass flasks, the applicant firstly observed some irregularity in the overmoulding, the position of the said overmoulding with respect to the receptacle varying from one overmoulding test to another, such that it is difficult to obtain strictly identical objects.

After analysing this problem, the applicant deduced that the position of the said receptacle in the mould varied in a more or less random manner during overmoulding.

Although this problem has been solved by firmly fixing the said receptacle with respect to the said mould, this also severely reduced the production rate, such that the applicant has attempt to find means of positioning the said receptacle that is stable during the entire overmoulding process and is reproducible from one overmoulding operation to another overmoulding operation, without penalizing the production rate.

The applicant has also observed that depending on the thickness of the glass used for the receptacle, a non-negligible failure or breakage rate of the receptacle of the order of 3% can occur, although in industrial production, each breakage means that the line has to be shutdown and the overmoulding station concerned has to be cleaned; the breakage rate should be less than $1/10^3$, or even less than $1/10^4$, to achieve productivity considered to be acceptable.

Finally, the applicant has also attempted to find a process that could be used to obtain all sorts of overmouldings. Although one result of overmoulding of a glass receptacle could be to mechanically reinforce the said receptacle, it may also and more importantly confer a large variety of shapes onto the said receptacle, and practically an infinite number of shapes starting from the same receptacle, which is a major advantage commercially and in terms of production.

In short, the applicant has attempted to find a process for overmoulding of glass receptacles at a high production rate, while obtaining an identical overmoulding. Furthermore, the applicant has also attempted to find means of reducing the breakage rate of glass receptacles, and to obtain all sorts of shapes of overmoulding.

DESCRIPTION OF THE INVENTION

In the process according to the invention for overmoulding of a hollow receptacle provided with an opening or a neck, and an axial body (71) typically including a shoulder, a sidewall and a bottom, the said hollow receptacle with axial height H and with a larger cross section S, for example being a glass flask.

a) all or part of the said hollow receptacle is placed in an open mould in at least two parts, and then after the said mould has been closed by moving at least a mobile part of the said mould so as to form an axial cavity, b) a flow of molten thermoplastic material is injected into the said axial cavity by an injection means, through an injection duct in the said mould, so as to form a deposit or an external layer of the said plastic material on all or part of the said receptacle, and thus to obtain an "overmoulded" receptacle, c) then, after the said deposit or the said external layer has cooled, the said mould is opened, and the said overmoulded receptacle is ejected from the said mould.

This process is characterized in that:

1) with the said mould being opened, at least the said neck of the said receptacle is placed bearing in contact with an axial support part, the said axial support part forming a part of the said mould and including a means of masking the said opening or the said neck throughout the said overmoulding process, so as to obtain the said overmoulded receptacle provided with a free neck and that can thus be closed off by closing means, 2) the said sidewall of the said receptacle is placed in a lateral positioning means, typically a centring means, typically before the said mould is closed, the said lateral positioning means being moveable along an axial direction of the mould, 3) after the said mould has been closed, the said lateral positioning means is displaced in the axial direction as the said material flow injected into the said axial cavity and forming an annular flow surrounding the said sidewall, moves axially forwards in the said axial cavity of the said mould, so as to obtain the said overmoulded receptacle, the axial displacement of the said lateral positioning means and the advance of the said material flow taking place along the same axial direction said to be "forwards", and typically being simultaneous, 4) after the said mould has been opened, the said overmoulded receptacle is ejected, typically by moving the said lateral positioning means along the axial direction said to be "backwards", the said lateral positioning means thus returning to its initial position in the said mould at the beginning of the overmoulding cycle.

The applicant has observed that this process solves the problems that arise.

As will be demonstrated below in more detail, the said lateral positioning means firstly solves the main problem of producing an overmoulded receptacle with constant configuration, without needing to reduce the normal production rate.

Furthermore, the applicant has observed that this lateral positioning means also provides a means of significantly reducing the receptacle breakage rate for fragile receptacles, particularly in the case of relatively thin glass receptacles.

DESCRIPTION OF THE FIGURES

All Figures relate to the invention. All Figures show axial sections, except for FIGS. 3b to 3e that show cross sections, and FIG. 15 that is a composite Figure.

FIGS. 1a to 2c illustrate different steps in the overmoulding process for a hollow receptacle (7) with a mould (2) including:
- at the right, a fixed front piece (23),
- at the left, a back mobile part (200) including an injection duct (210),
- at the centre, two lateral mobile parts (201),
- an axial support part (4, 4'),
- an axially mobile part (30) forming a lateral positioning means (3) of the receptacle.

FIG. 1a shows the open mould (2).

FIG. 2c shows ejection of the overmoulded receptacle (8).

These Figures do not explicitly show the means (9) for axially displacing the mobile tubular part (300), in order to not complicate these Figures excessively.

FIGS. 3a to 3e illustrate hollow receptacles (7) that can be overmoulded according to the process according to the invention.

Figure 3A:
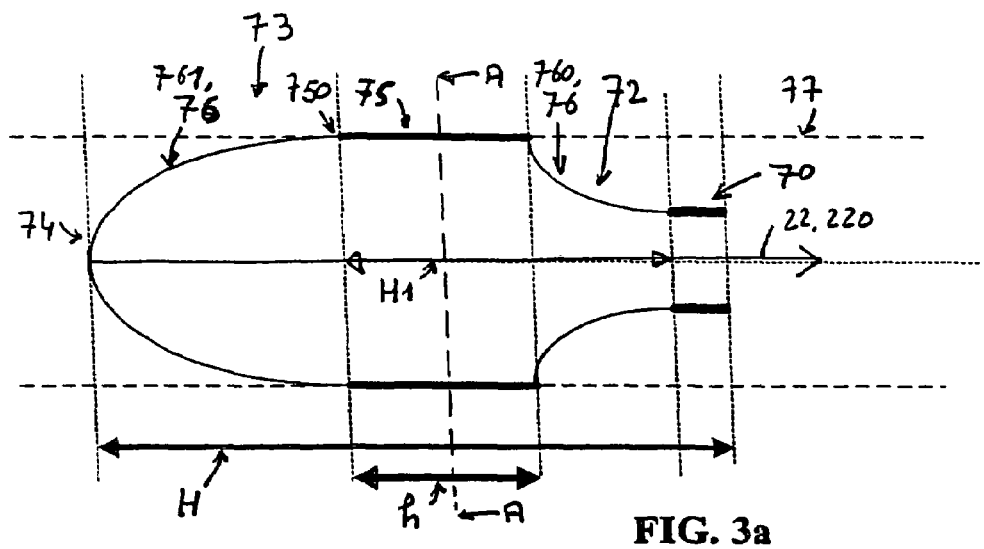

FIG. 3a shows such a hollow receptacle (7) that generically from right to left comprises a neck (70) and a body (71) comprising a shoulder (72), a sidewall (73) and a bottom (74), the said sidewall (73) being defined as having a larger section S and typically a constant section S over a height h equal to at least 0.1.H.

In FIG. 3a, the part (75) of the section S of the sidewall (73), and the neck (70) are shown by a thicker line than the remainder of the hollow receptacle (7).

FIGS. 3b to 3e illustrate different sections of hollow receptacles (7) in plane A-A in FIG. 3a. These sections are not shown cross-hatched, and the hollow receptacle (7) is not shown cross-hatched in the following Figures, in order to avoid overcomplicating the Figures.

Figure 3B:
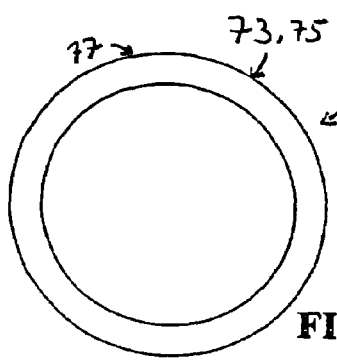

FIG. 3b shows a round section.

Figure 3C:
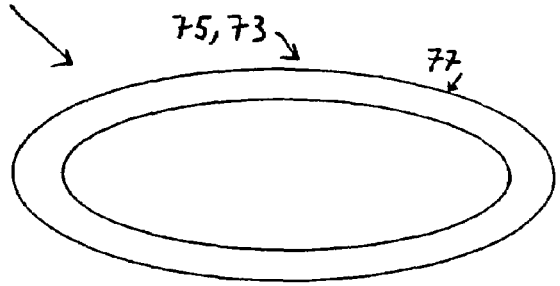

FIG. 3c shows an oval section.

Figure 3D:
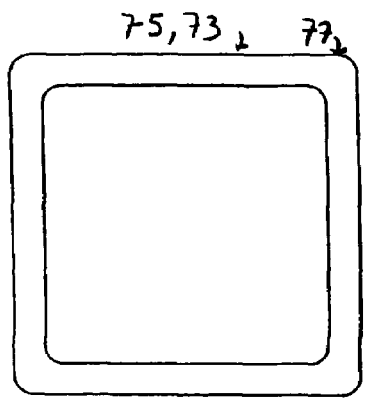

FIG. 3d shows a square section.

Figure 3E:
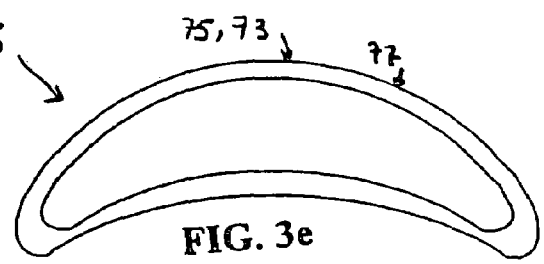

FIG. 3e shows a moon-shape section comprising a concave part.

FIGS. 4a to 6b illustrate the moulding process, these Figures being at a larger scale than FIGS. 1a to 2c that also illustrate the moulding process.

In these Figures, and in the subsequent Figures, the mobile parts (20, 200, 201) and the front parts (24, 24') are not shown cross-hatched to avoid excessively complicating the Figures.

Figure 4A:
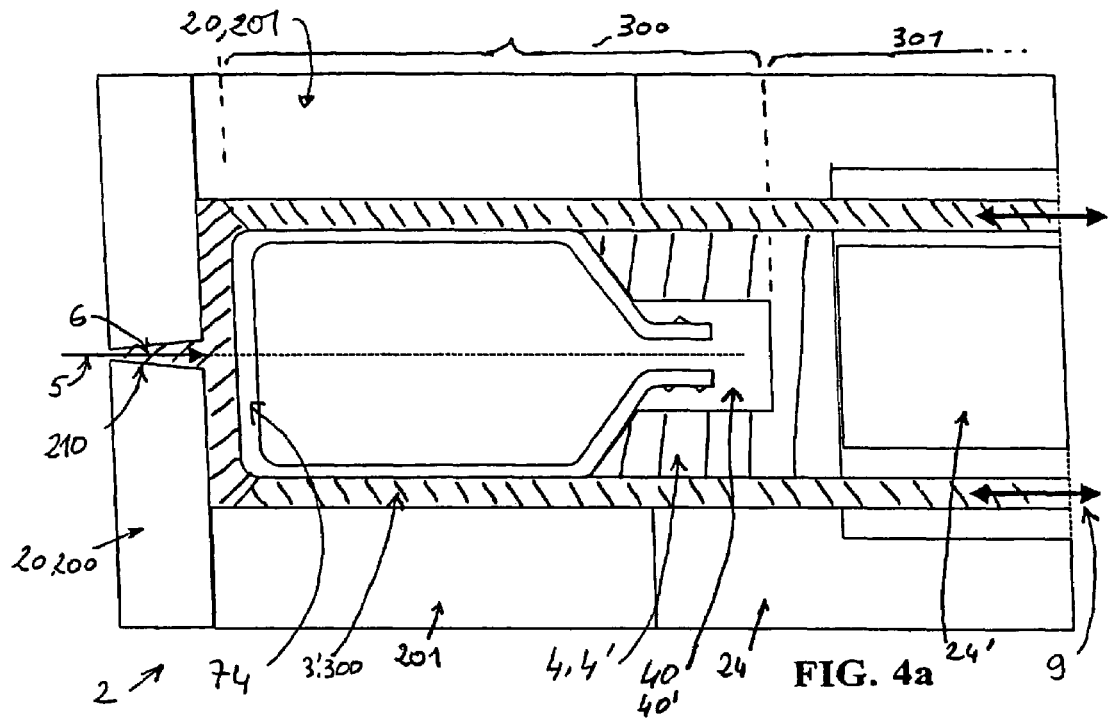

FIG. 4a shows the beginning of overmoulding.

Figure 1A:
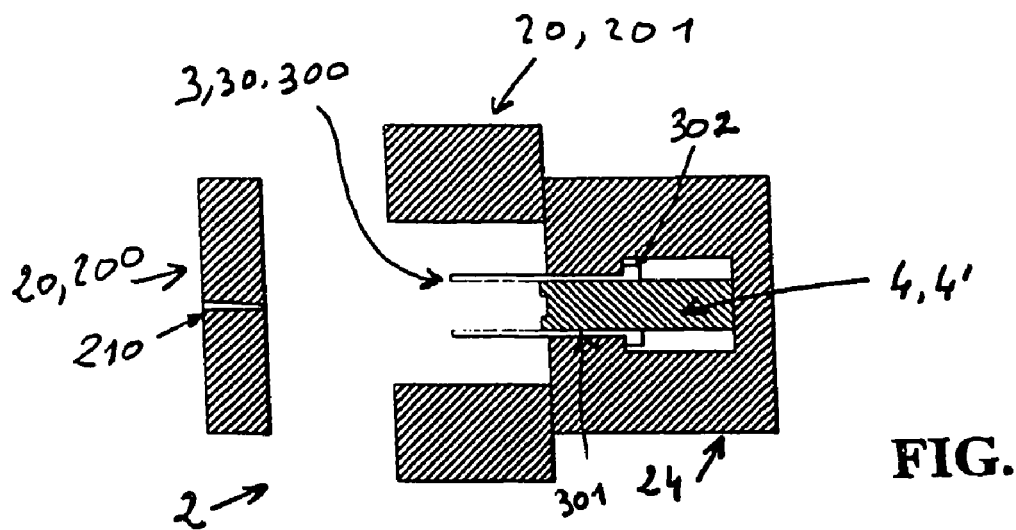
Figure 1B:
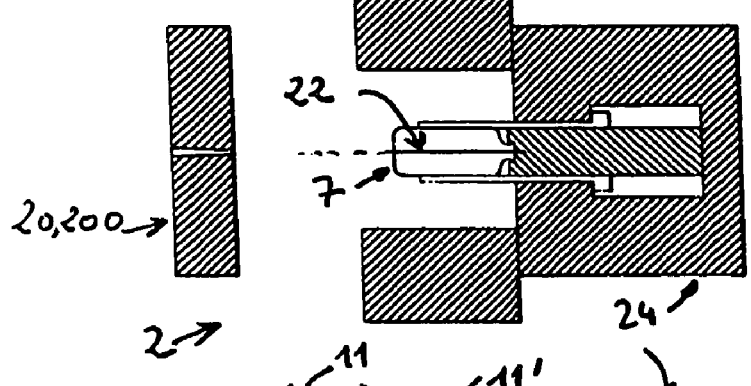
FIG. 1b shows the open mould (2), the said hollow receptacle (7) being placed in the mould.
Figure 1C:
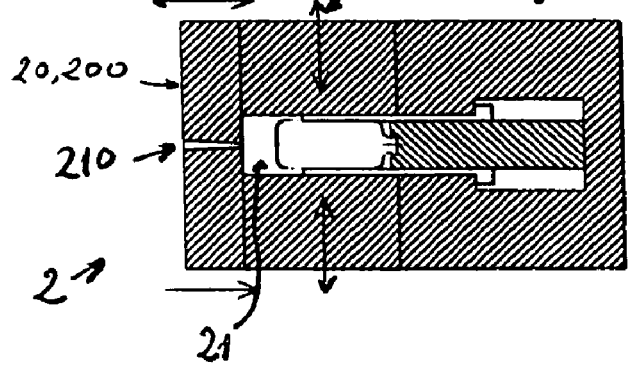
FIG. 1c shows the closed mould (2).
Figure 1D:
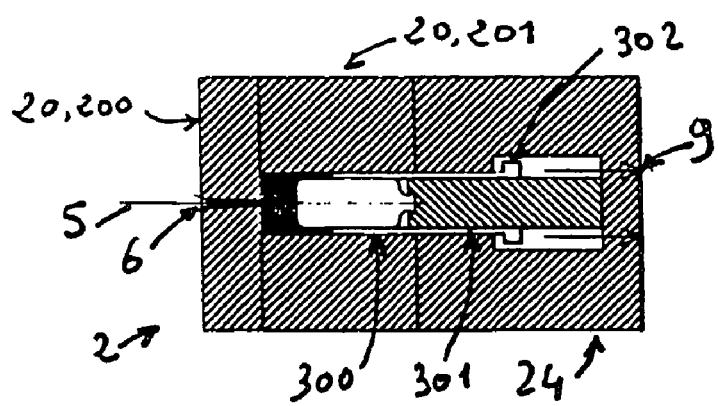
FIG. 1d shows an intermediate phase in overmoulding of the hollow receptacle (7) with a flow of molten plastic material, the arrival of the plastic material being represented by an arrow pointing towards the injection duct (210).
Figure 4B:
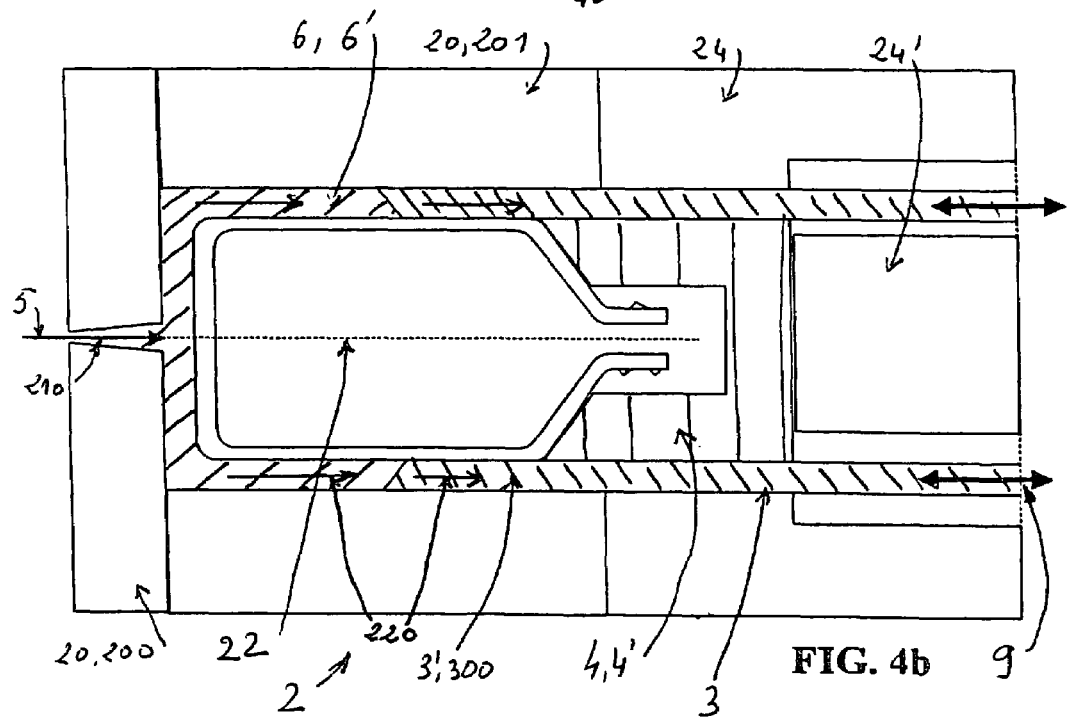

FIG. 4b shows an intermediate phase in overmoulding, this Figure corresponding to FIG. 1d. The said forward axial direction (220) has been shown in this Figure.

Figure 2A:
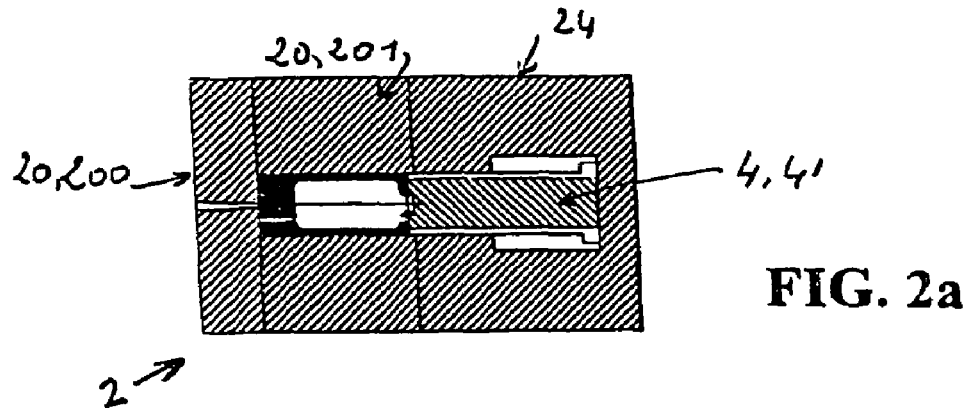
FIG. 2a shows the end of overmoulding of the hollow receptacle (7).
Figure 2B:
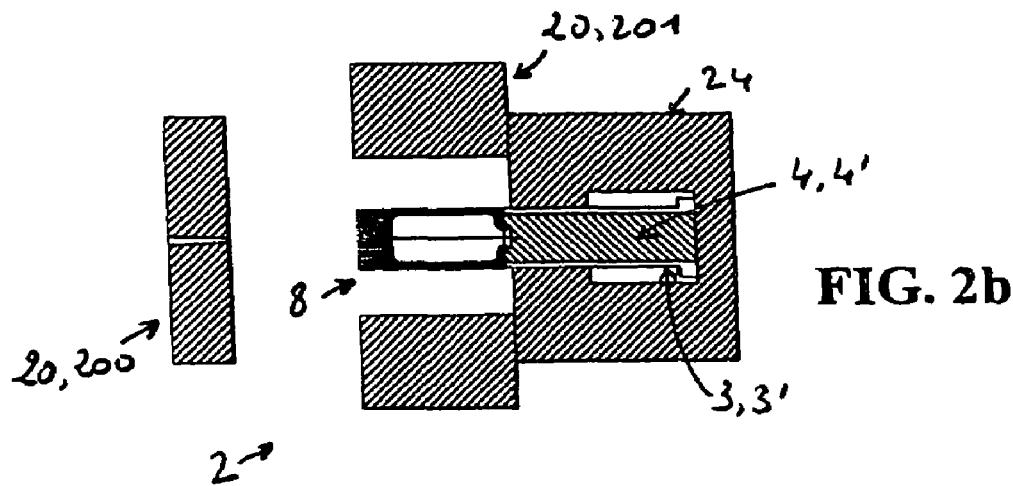
FIG. 2b shows the open mould (2).
Figure 2C:
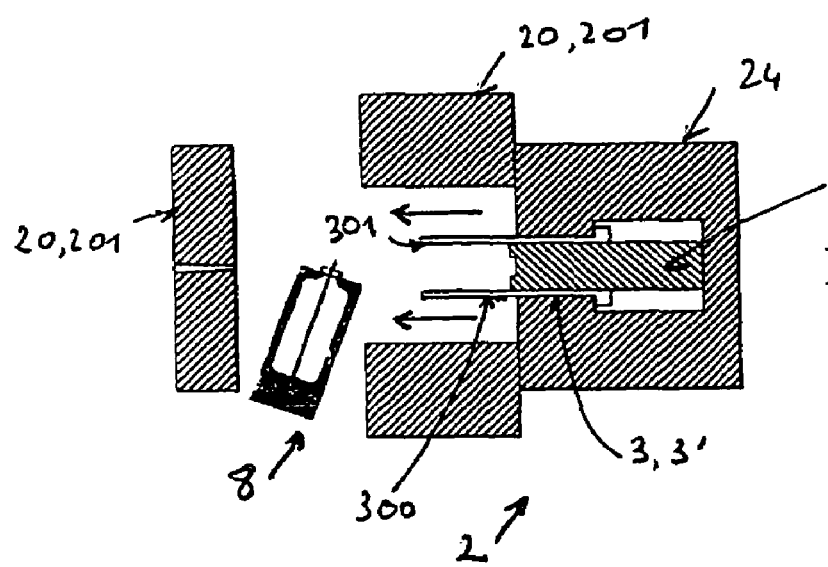
Figure 5A:
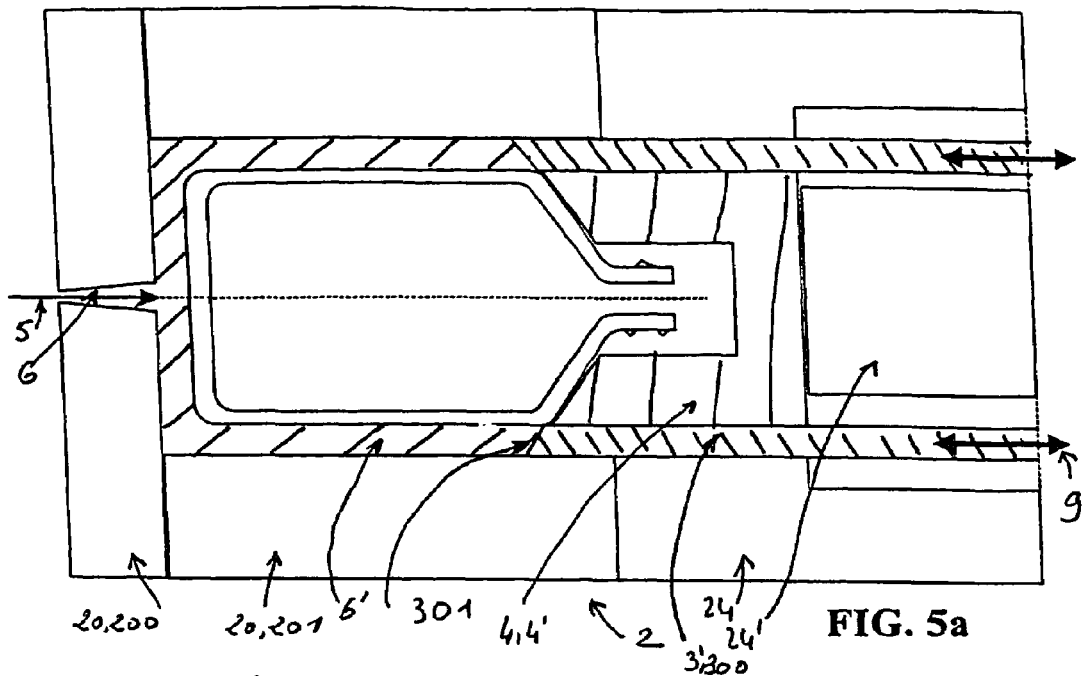

FIG. 5a shows the end of overmoulding, this Figure corresponding to FIG. 2a.

Figure 5B:
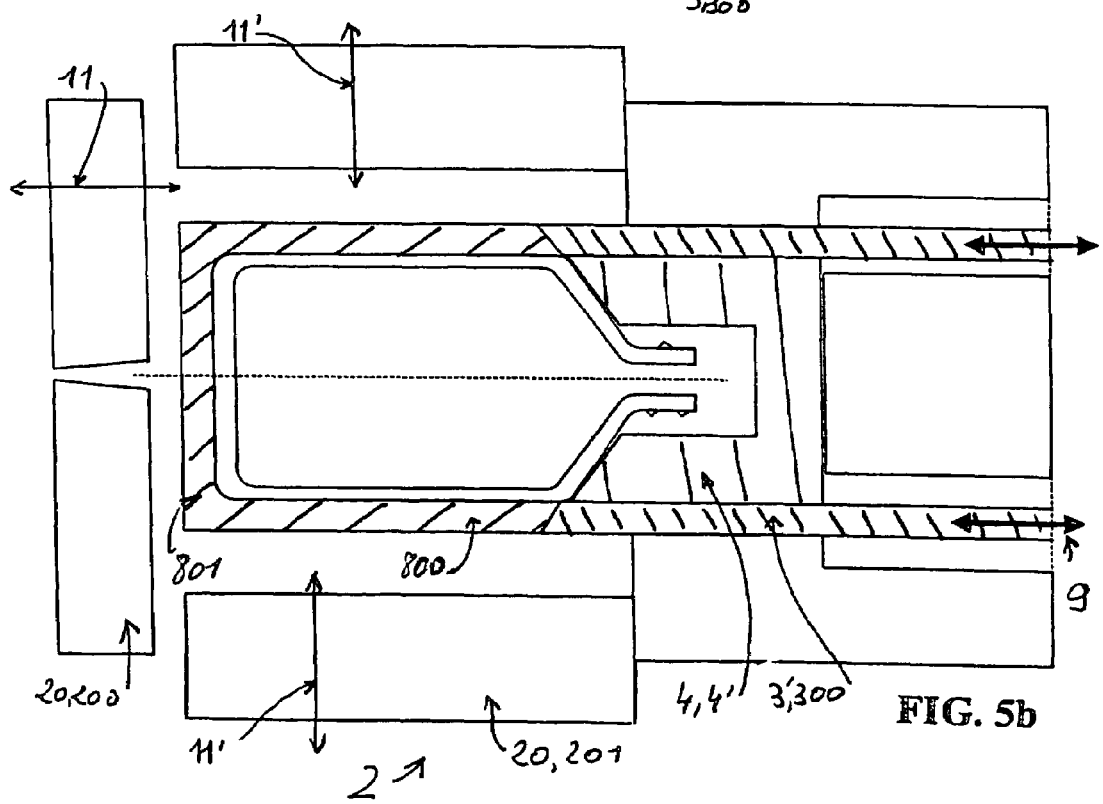

FIG. 5b shows the open mould.

Figure 6A:
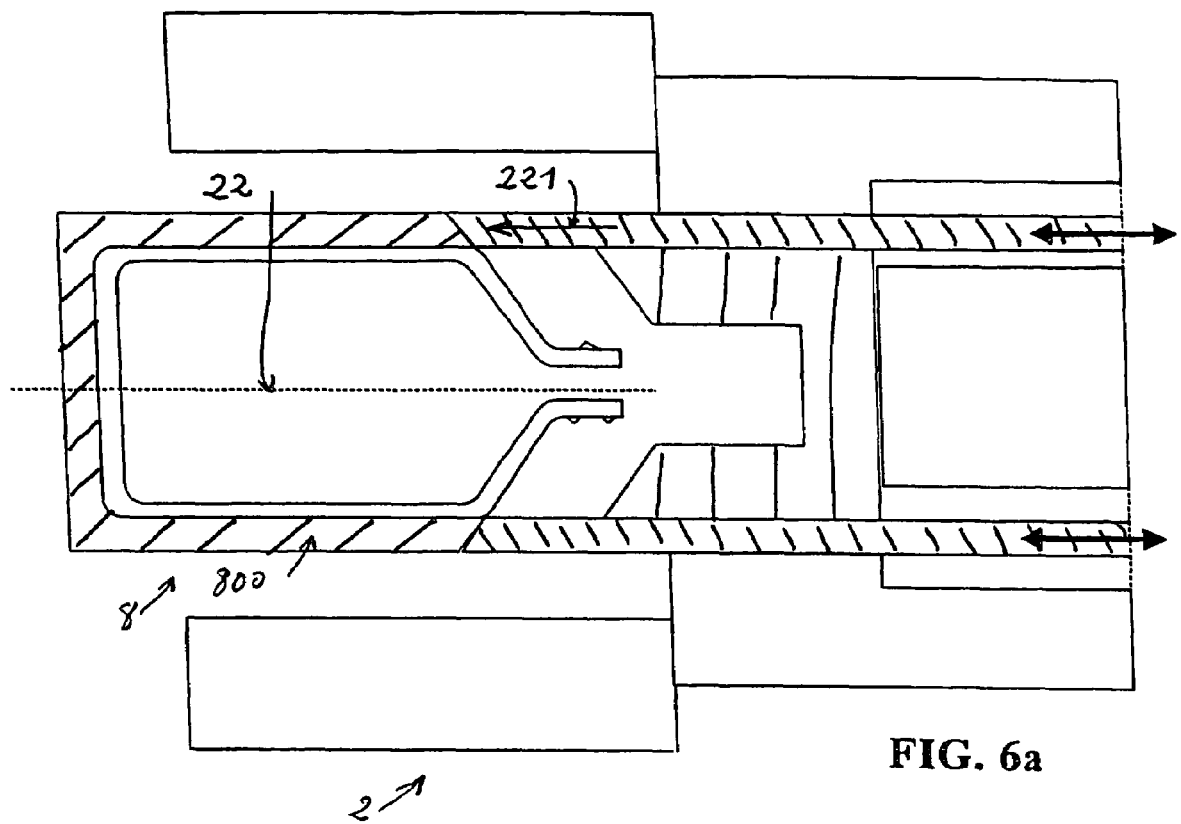

FIG. 6a shows ejection of the overmoulded receptacle (8) by backwards displacement of the mobile tubular part (3). The backwards axial direction (221) has been shown in this Figure.

Figure 6B:
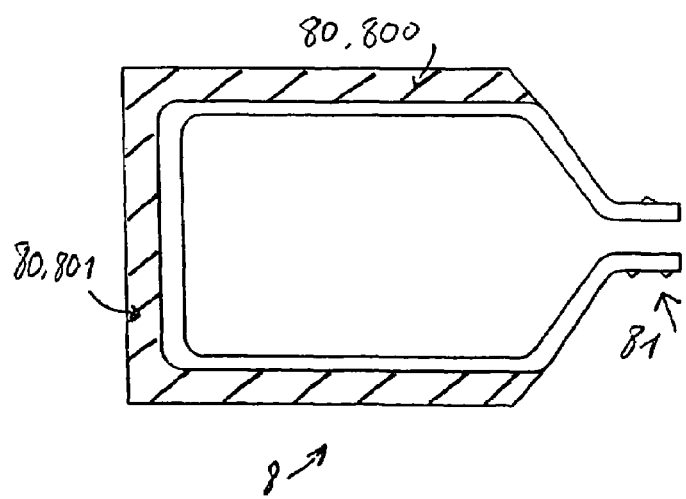
Figures 7A, 7B:
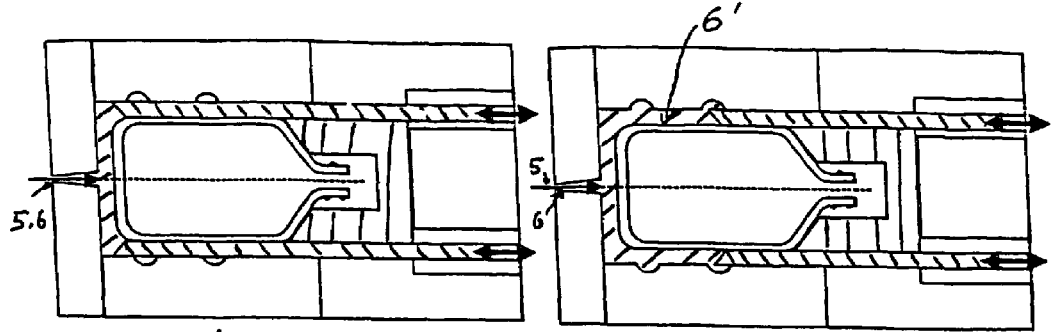
Figures 7C, 7D:
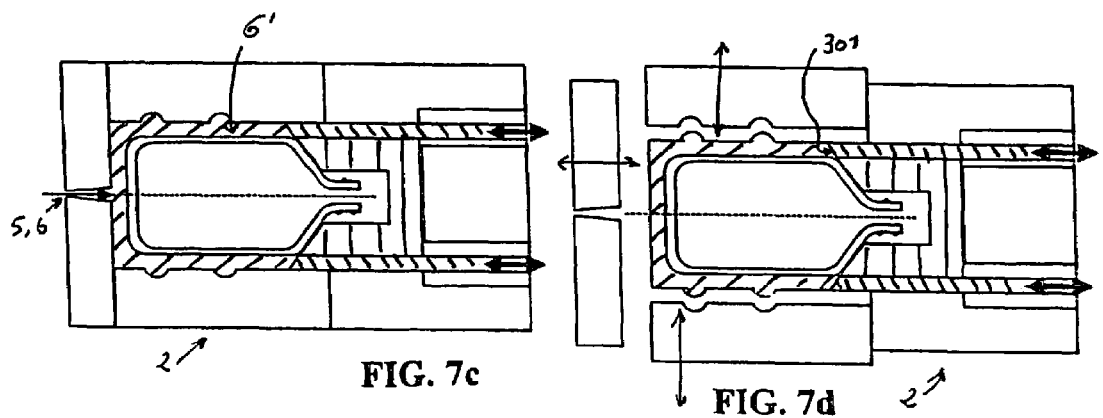
Figure 7E:
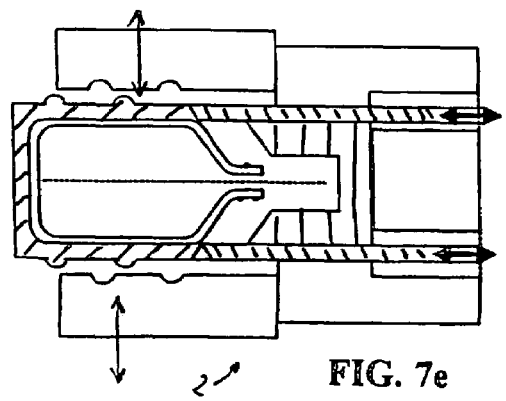
Figure 7F:
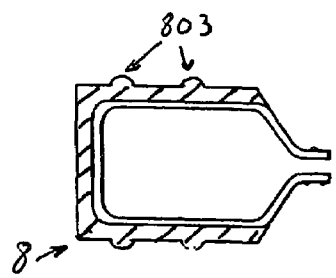

FIG. 6b shows the overmoulded receptacle (8).

FIGS. 4a to 6a show the means of axially displacing the mobile tubular part (300) by two double arrows at the right.

FIGS. 7a to 7f, corresponding to FIGS. 4a to 6b, illustrate the case in which the lateral parts (200) comprise elements in relief or recessed elements on the inside, so as to obtain an overmoulded receptacle comprising recessed elements or elements in relief (803) on its sidewall.

FIGS. 8a to 8f, corresponding to FIGS. 7a to 7f, illustrate the case in which the back part (200) is not plane, so as to form a particular overmoulding bottom (801).

FIGS. 9a to 9f, corresponding to FIGS. 8a to 8f, illustrate the case in which the back part (200) includes several injection ducts (210) and includes a central part masking the bottom (74) of the hollow receptacle (7) such that there is no deposit of plastic material on the bottom (74) of the hollow receptacle (7).

FIGS. 10a to 11b illustrate the case in which the means (9) for providing axial displacement of the mobile tubular part (300) is composed of a spring (90).

Figure 10A:
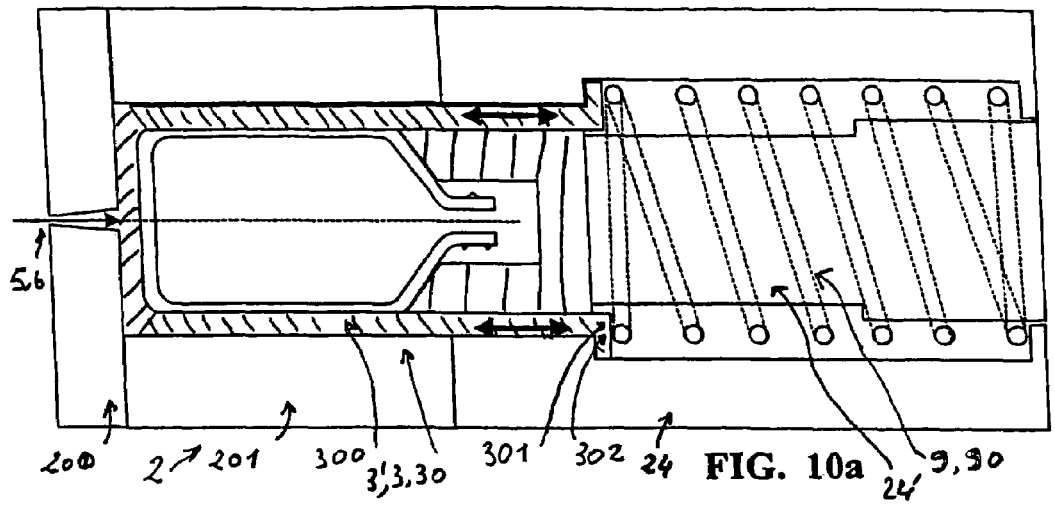

FIG. 10a corresponds to FIG. 4a.

Figure 10B:
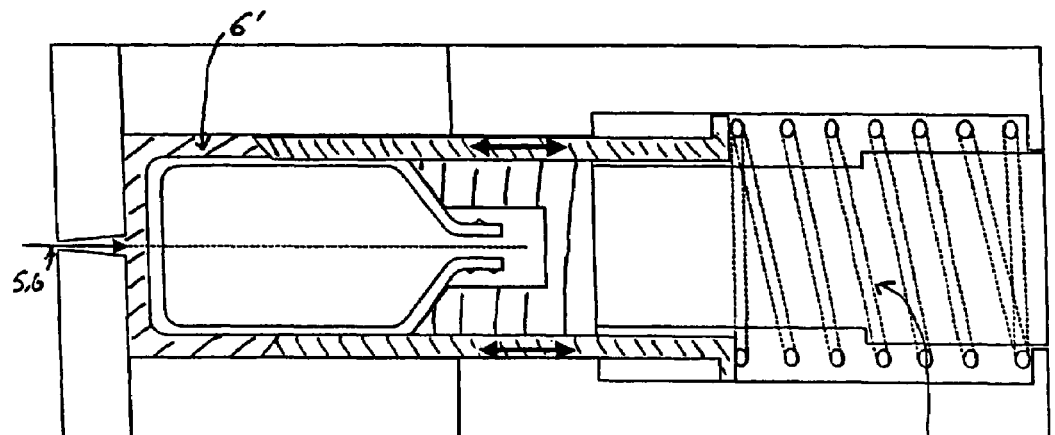

FIG. 10b corresponds to FIG. 4b.

Figure 10C:
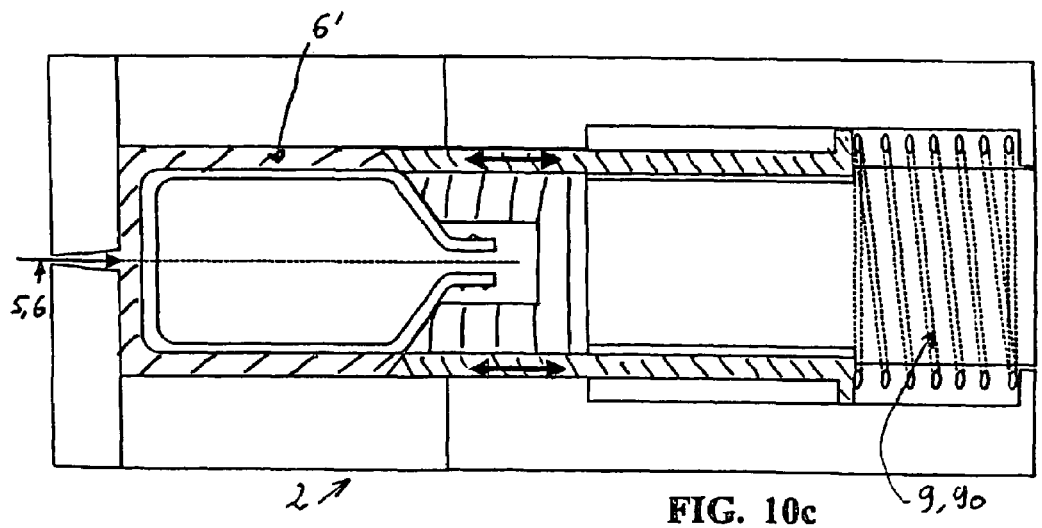

FIG. 10c corresponds to FIG. 5a.

Figure 11A:
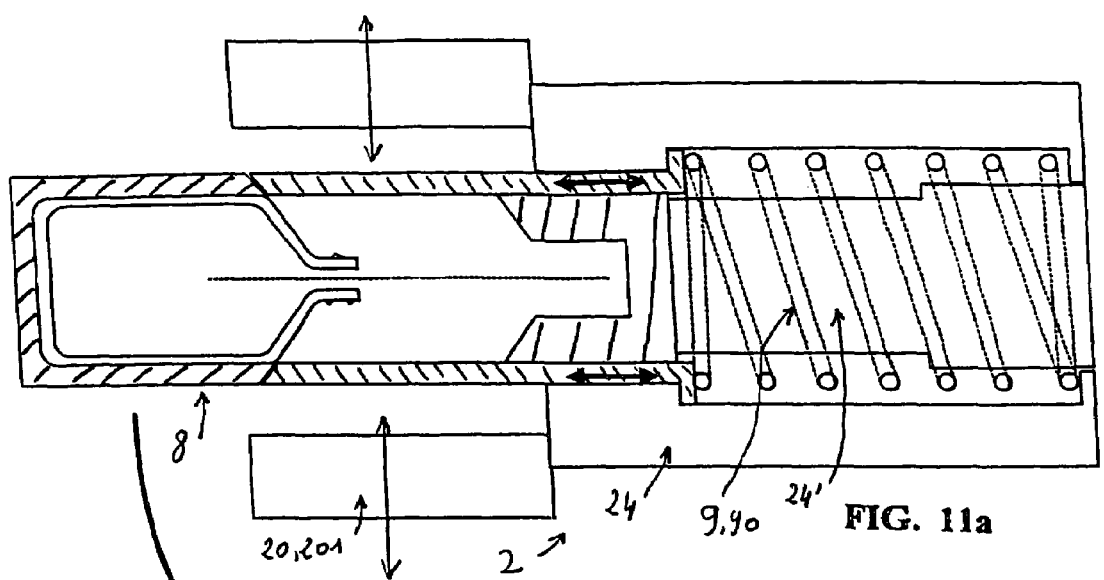

FIG. 11a corresponds to FIG. 6a.

Figure 11B:
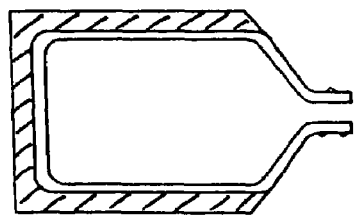

FIG. 11b corresponds to FIG. 6b.

FIGS. 12a to 12d illustrate the case in which the overmoulding is followed by a complementary overmoulding.

Figure 12A:
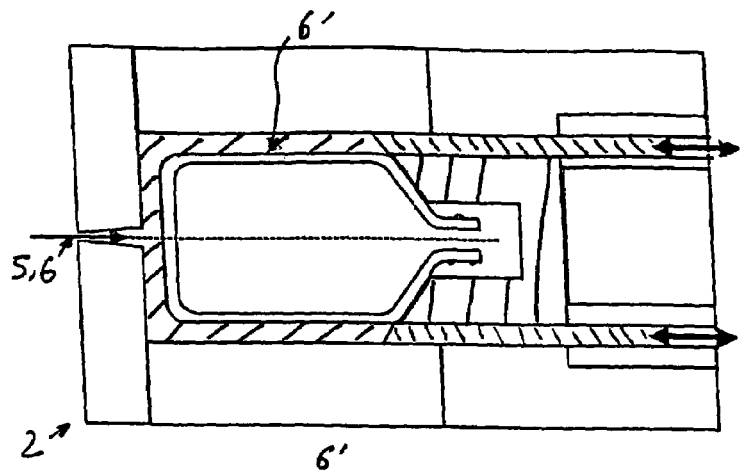

FIG. 12a corresponds to FIG. 5a at the end of overmoulding.

Figure 12B:
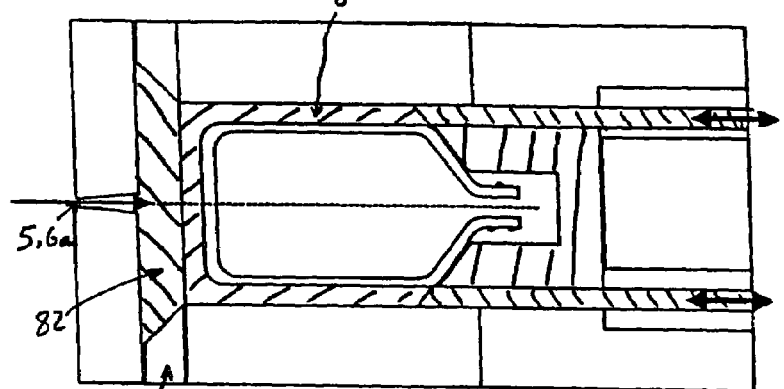

FIG. 12b shows the end of complementary overmoulding, the mould comprising a second mobile part (23) that does not appear in the mould in FIG. 12a.

Figure 12C:
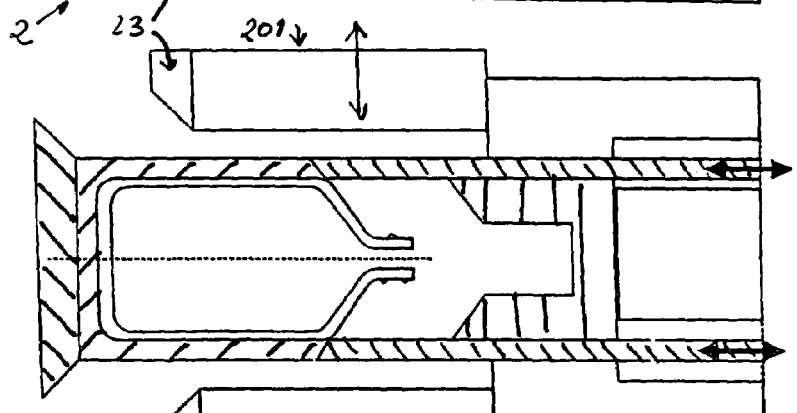

FIG. 12c corresponds to FIG. 6a.

Figure 12D:
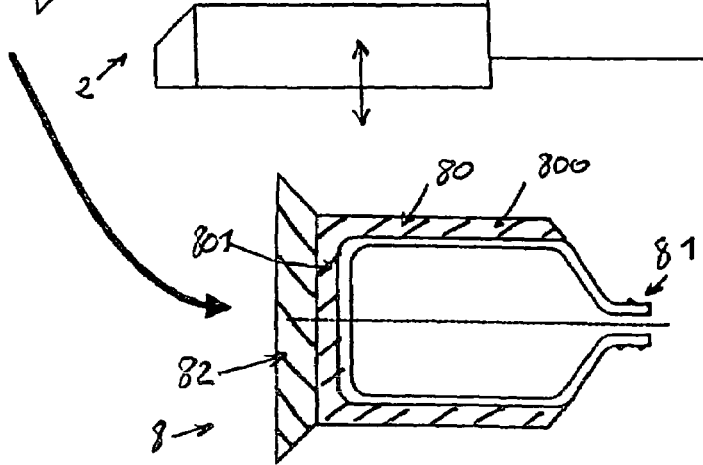

FIG. 12d corresponds to FIG. 6b.

Figure 13A:
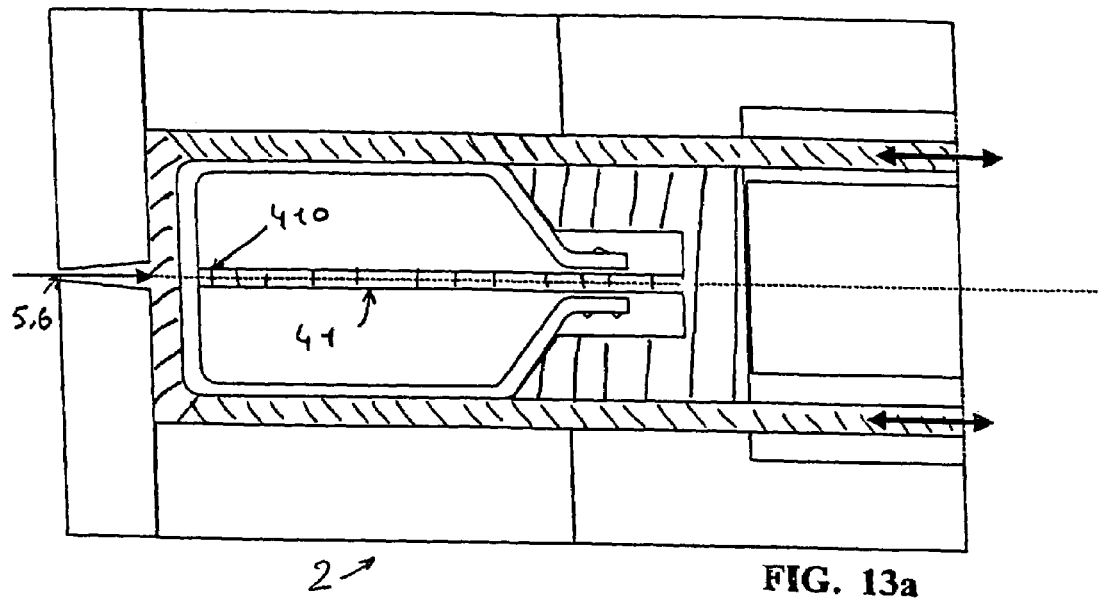
Figure 13B:
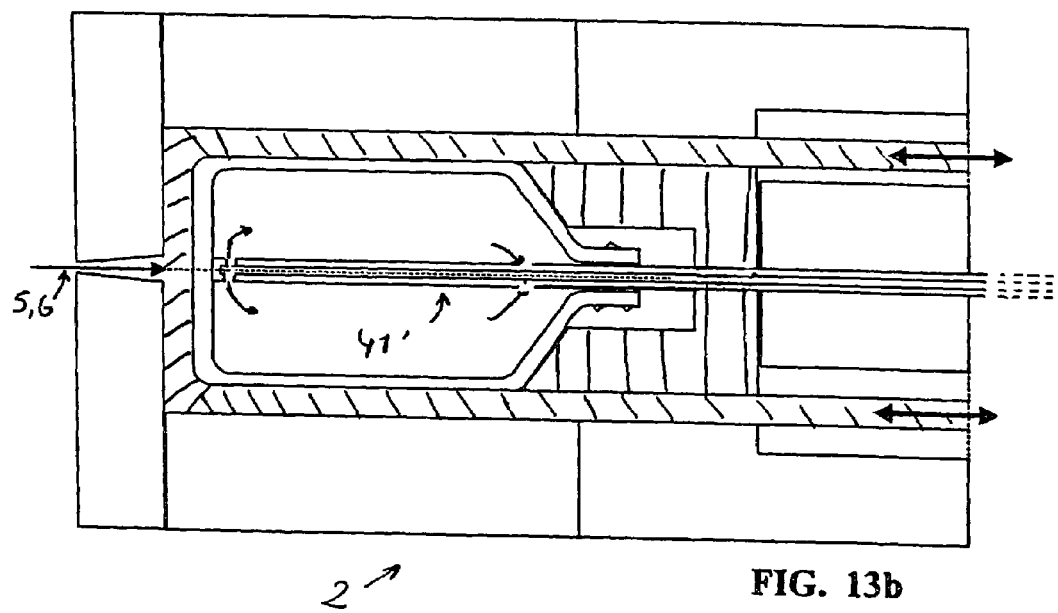

FIGS. 13a and 13b, corresponding to FIG. 5a, illustrate the case in which the axial support part (4, 4') includes an axial projection (41), for which the back end (410) bears on the bottom (74).

In FIG. 13a, the said axial projection (41) is a solid rod, whereas it is a coaxial tube (41') enabling air circulation to accelerate cooling of the overmoulded receptacle (8).

Figure 14A:
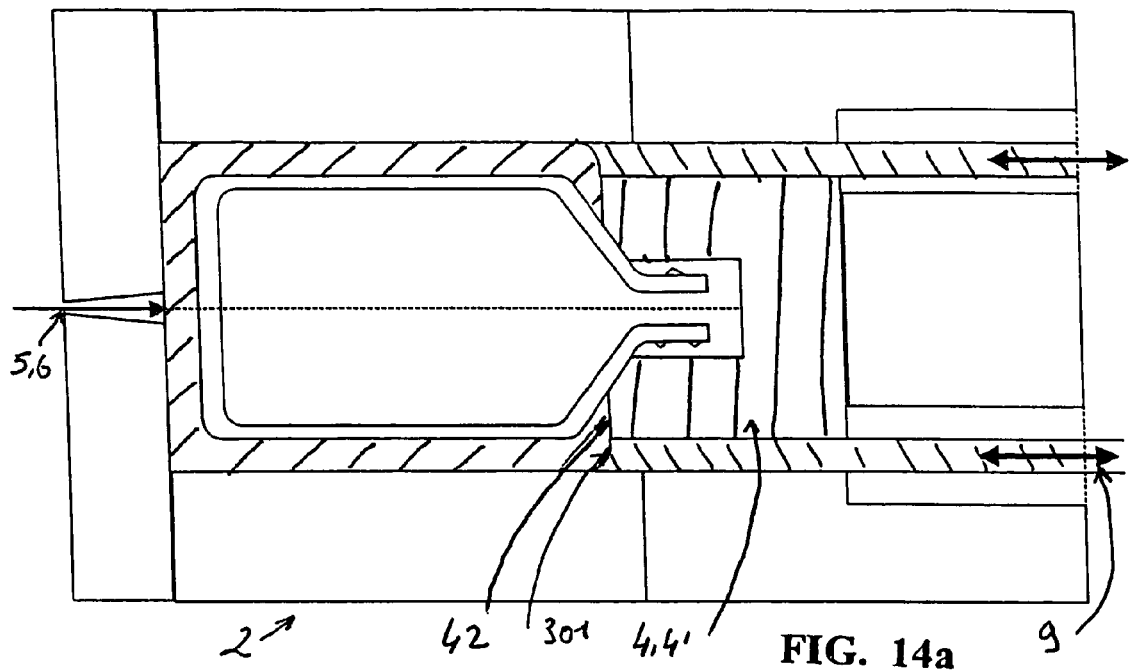
Figure 14B:
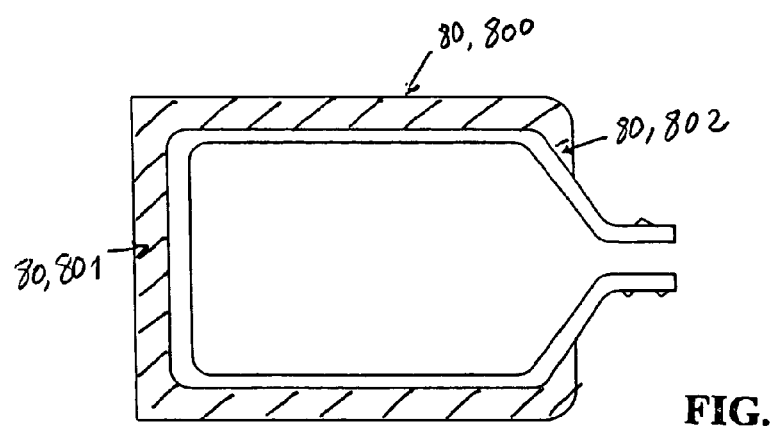

FIGS. 14a and 14b correspond to FIGS. 5a and 6b and represent the case in which overmoulding of the hollow receptacle (7) extends over a part of its shoulder (72) to form a layer (802) on part of the shoulder (72).

Figure 15:
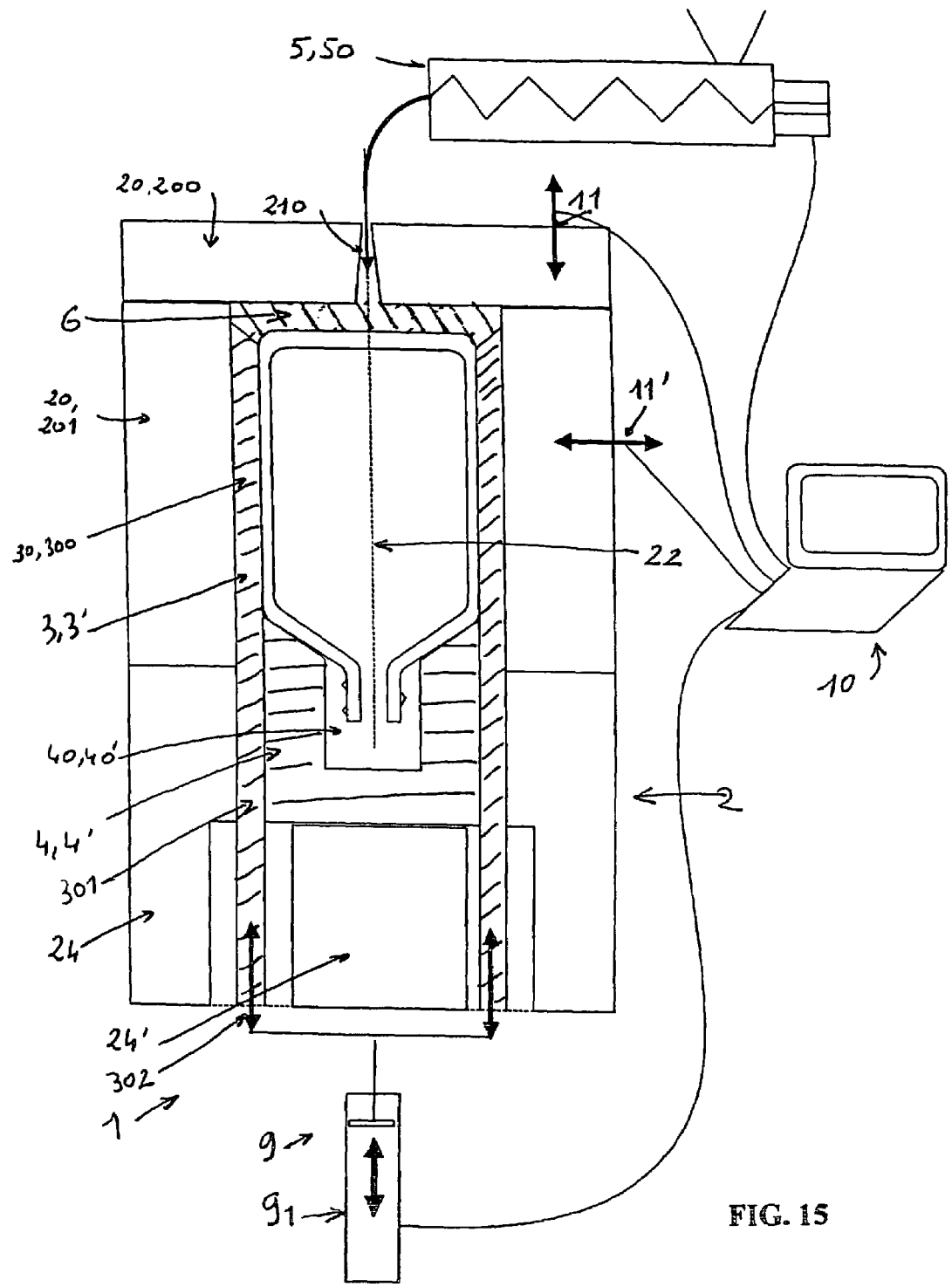

FIG. 15 diagrammatically illustrates automatic use of the overmoulding device (1) comprising the mould (2) in FIG. 4a with an axial direction (22) in the vertical direction, and its environment represented diagrammatically: injection means (5) with an extrusion machine (50), automatic means (11, 11') of opening the mould (2), means (9) of displacing the mobile tubular part (300) represented by a hydraulic jack (91), and a means (10) of automating the entire overmoulding device shown diagrammatically by a screen and a computer keyboard.

DETAILED DESCRIPTION OF THE INVENTION

According to the invention, and as illustrated in the Figures, particularly in FIGS. 10a to 11a and FIG. 15, the said lateral positioning means (3) can be an automatic lateral positioning means (3').

As illustrated for example in FIG. 4a, the said axial support part (4) may be a so-called "front" axial support part (4') comprising a recess (40) typically forming a blind hole (40') capable of cooperating with the said neck (70) so as to mask the said neck (70) during the said overmoulding.

As illustrated for example in FIGS. 1a and 4a, the said mobile part (20) of the said mould (2) may include a so-called "back" part (200), the said back part (200) typically comprising the said injection duct (210), such that during the said overmoulding, the said external layer (80) is firstly formed on the said bottom (74) of the said receptacle (7).

As illustrated in FIGS. 13a and 13b, the said axial support part (4) may include an axial projection (41, 41').

This axial projection:

a) can be centred with respect to the said neck (70) or with respect to the said recess (40) or blind hole (40'), b) may have a section and typically a diameter less than the internal section or the inside diameter of the said neck (70), so as to be able to penetrate into the said hollow receptacle (7) when the said neck (70) cooperates with the said recess (40) or the said blind hole (40'), c) may have an axial length corresponding to the depth of the said receptacle (7), so that the said axial projection (41, 41') has one end called the back end (410) in contact with the said bottom (74) when the said neck (70) cooperates with the said recess (40) or the said blind hole (40'), so that the said flow of molten thermoplastic material (6) applies an axial pressure on the said receptacle during the said overmoulding, the said axial pressure applied on the said receptacle (7) is transmitted to the said axial support part (4), partly through the said bottom (74) through the said axial projection (41, 41'), and partly transmitted by the said neck (70) or the said shoulder (72) such that the said neck or the said shoulder applies a limited front axial pressure in contact with the said axial support part (4), reducing the risks of breakage of the said neck (70) or the said shoulder (72) during the said overmoulding.

Advantageously, this axial projection (41, 41') may form or may comprise a calibrated spring so that its back end (410) applies a "backwards" axial force with a predetermined intensity or value on the said bottom (74) of the receptacle.

According to the invention, the said lateral positioning means (3) may form a part (30) free to move in the axial direction cooperating with the said axial support part (4, 4'). Cooperation between the said axial support part (4, 4') and the said axially mobile part (30), as illustrated in the Figures, arises because these parts are coaxial and adjacent to form the front part of the said axial cavity (21), to assure overmoulding of the upper part of the said hollow receptacle (7), and particularly all or part of its shoulder (72).

In this case:

a) the said wall (73) of the said receptacle (7) may include a part (75) with a maximum section S, the said section S being typically constant over an axial height h equal to at least 0.1.H, the said wall (73) of the said receptacle (7) typically having a remaining part (76) with section S'<S, b) the said mobile part (30) may include a tubular part (300) free to move inside the said mould (2) along an axial direction and with the said section S on the inside, such that the said tubular part (300) assures predetermined positioning, and typically centring, of the said wall (73) of the said receptacle (7) in the said axial cavity (21), c) when the said flow of thermoplastic material (6) is injected into the said cavity, the said mobile tubular part (300) may be moved axially forwards in the direction of the said neck (70) when the said flow (6) forms an annular flow of plastic material (6') capable of occupying an annular space released at the back of the said mobile tubular part (300) displaced such that the said annular flow (6') that will form an annular layer (800) of the external overmoulding layer (80), is progressively and at least partially substituted for the said mobile part (300), and thus in turn enables the said predetermined positioning or the said centring of the said wall (73) of the said receptacle (7) in the said axial cavity (21).

FIGS. 4a to 6b illustrate the process according to the invention in more detail.

The said tubular part (300) has one end (301) that forms a part of the said moulding cavity at the end of overmoulding, as can be seen for example in FIG. 5a.

As illustrated in FIG. 3a, the said part (75) of the said wall (73) of the said hollow receptacle (7) has the said constant section S on the outside over a height h such that the ratio h/H varies from 0.15 to 0.85.

The said part (75) with constant section S may have a back end (750) at an axial distance H1 from the said neck (70) such that the distance H1 is equal to at least 0.3H, so as to assure the said predetermined positioning or the said centring of the said wall (73) of the said hollow receptacle (7) in the said cavity (21).

The applicant has observed that the hollow receptacle (7) is thus perfectly immobilized in the said cavity throughout the overmoulding process, so as to obtain an overmoulded receptacle with a completely reproducible overmoulding layer (80), even at a high rate.

As illustrated in FIGS. 3b to 3e, the said constant section S has an arbitrary shape, typically square or rectangular or triangular or circular or oval.

As illustrated in FIG. 3c, the said constant section S may include at least one concave portion.

As illustrated in FIG. 3a, the said remaining part (76) of the said wall (73) has a section S'<S and it may comprise a part called the front part (760) located entirely inside a tubular surface (77) projected in the axial direction, bearing on the said part (75) with maximum section S, so as to enable the said axial displacement of the said mobile part (30) or the said mobile tubular part (300).

This front part (760) of the said remaining part (76) may comprise or form a shoulder (72) of the said hollow receptacle (7), in other words a connection between a small section neck (70) and the said sidewall (73) or the said part (75) of the sidewall (73) with section S.

According to the invention, all or part of the said axial support part (4, 4') of the said mould (2) may have approximately the same section S on the outside such that the said mobile tubular part (300) with the said section S on the inside can slide coaxially with respect to the said axial support part (4, 4').

Thus, between the said support part (4, 4') and the said mobile tubular part (300), there is a "mechanical" link that prevents any possibility of lateral or radial deviation of the mobile tubular part (300) and therefore the receptacle (7) surrounded by the said mobile tubular part (300). Furthermore, the said mobile tubular part (300) can also be guided by other parts of the mould, by lateral parts (201) or front parts (24), while the said axial support part (4, 4') can be held in position by front parts (24, 24').

As illustrated for example in FIGS. 1a and 4a, the said mobile part (30) may comprise a front part (301) cooperating at its front end (302) with an axial displacement means (9). The "back" part of the said mobile part (30) is formed by the said mobile tubular part (300) that cooperates with the part (75) of the wall (73) with section S, and with all or part of the axial support part (4, 4').

As illustrated in FIGS. 10a to 11a, the said axial displacement means (9) may comprise a helical spring (90) that will control a backwards axial displacement of the said mobile tubular part (300), typically when the said mould (2) is opened, the said flow of thermoplastic material (6) exerting a sufficient axial pressure against the said mobile tubular part (300) to resist the action of the said spring (90) and to move the said mobile tubular part (300) forwards during the said overmoulding.

As illustrated in FIG. 15, the said axial displacement means (9) may comprise an auxiliary displacement means, for example a hydraulic jack (91) controlling a displacement or axial translation, or by an electric motor provided with a rack transforming a rotation movement into axial translation, to assure axial translation of the said mobile tubular part (300), for example by means of a rod cooperating with the said front end (302) of the said mobile part (30).

Advantageously, the said axial displacement means (9) may be slaved to the said injection means (5), such that the said mobile part (30), or the said mobile tubular part (300) is moved forwards as the said flow (6, 6') progresses in the said cavity, as if the said mobile part (30) or the said mobile tubular part (300) was "pushed" by the said flow (6, 6') during overmoulding of the said part (75) of the wall (73) with constant section S.

This is the case with the device shown in FIG. 15, that thus perfectly controls the pressure inside the said cavity as the overmoulding progresses.

As illustrated in FIG. 14a, in addition to the said recess (40) or the said blind hole (40'), the said axial support part (4, 4') may have a front moulding surface forming a front wall (42) of the said cavity (21) so as to achieve overmoulding of the said front part (760) of the said wall (73) with section S'<S, and possibly overmoulding of the said shoulder (72).

As illustrated in FIG. 3a, the said remaining part (76) of the said wall (73) with section S'<S may comprise a so-called back part (761) typically entirely located inside the said projected tubular surface (77) of the said constant section S.

Typically, the said mobile part (20) or the said back part (200) including the said injection duct (210) may form a back moulding surface forming a back part of the said cavity so as to overmould all or part of the said back part (761) of the said wall (73), and possibly overmoulding of all or part of the said bottom (74) of the said hollow receptacle (7).

Figure 9A:
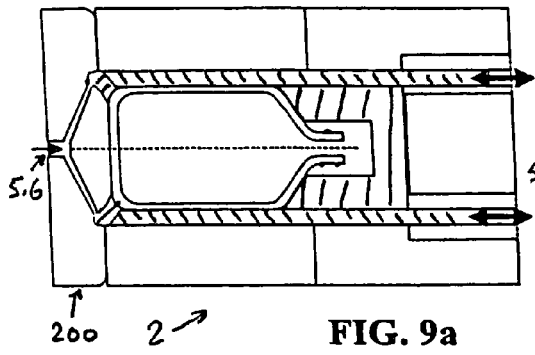
Figure 9B:
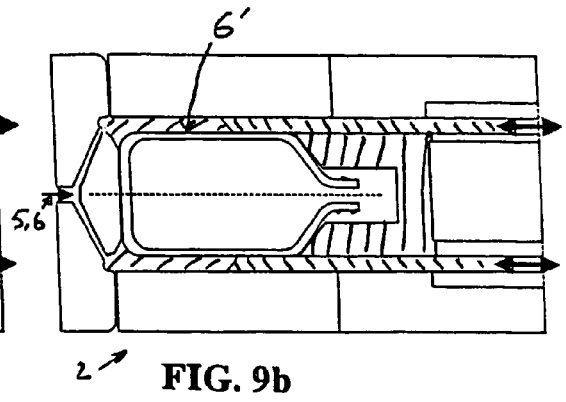
Figure 9C:
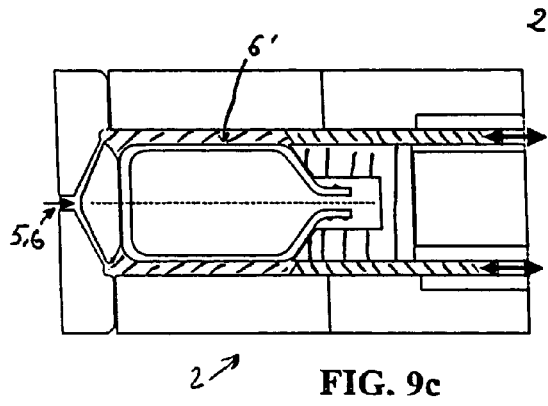
Figure 9D:
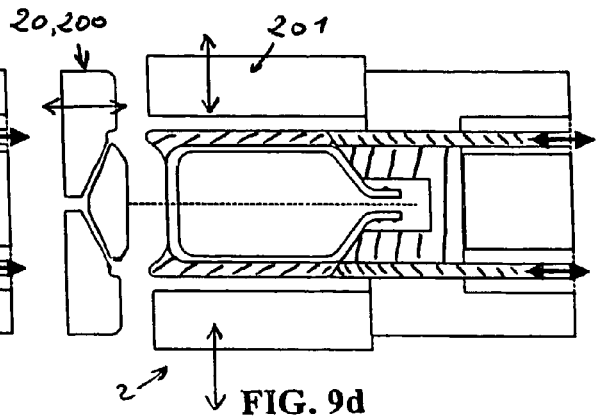
Figure 9E:
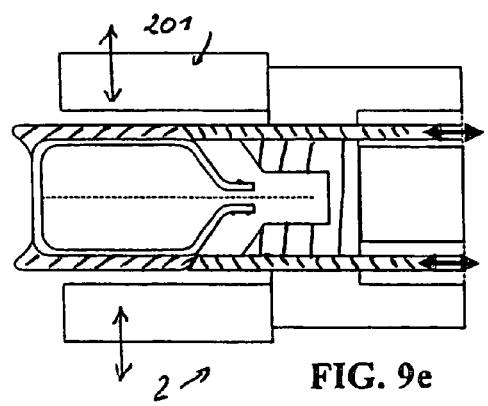
Figure 9F:
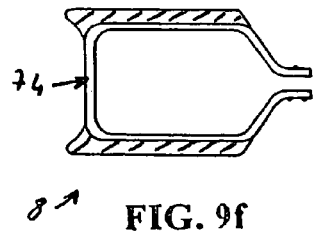

This back part (200) may be plane as illustrated in FIGS. 1a, 4a, 7a, 10a, 12a and 13a, or it may be non-plane as illustrated in FIGS. 8a and 9a.

As illustrated in FIGS. 12a to 12d, at the end of overmoulding, the said mobile part (20), the said back part (200) and/or the said lateral part (201) of the mould (2) may be replaced by a second mobile part (23) of the mould (2) in order to achieve complementary overmoulding by a complementary flow (6a) of thermoplastic material, and form a complementary deposit (82) of thermoplastic material, typically fixed to the said overmoulding bottom (801), the said complementary deposit (82) possibly having an arbitrary section S", where S" may be >S.

As illustrated in FIGS. 2c, 6a, 7e, 8e, 9e, 11a and 12c, at the end of overmoulding or possibly at the end of the said complementary overmoulding, the said mobile tubular part (300) may be displaced backwards in the axial direction towards the said bottom (74), so as to enable or facilitate ejection of the said overmoulded receptacle (8).

According to the invention, the height H of the said hollow receptacle (7) can vary from 40 mm to 90 mm.

The largest cross-section S of the said hollow receptacle (7) can vary from 500 mm$^2$ to 2500 mm$^2$.

Typically, the said hollow receptacle (7) may be a glass receptacle, typically intended to contain a cosmetic product, or particularly a perfume.

According to the invention, the said thermoplastic material forming the said flow (6) and/or the said complementary flow (6a) may be chosen from among transparent or translucid thermoplastic materials and particularly ionomer resins, typically Surlyn®, PP, typically a clarified PP, polyesters, typically a PCTA copolyester, and elastomers.

However, the said thermoplastic material forming the said flow (6) and/or the said complementary flow (6a) may be a soft plastic material, preferably transparent, with a Shore A hardness varying from 15 to 77, the said soft plastic material typically being an elastomer, for example TPE, SBS, SEBS.

The said flow of molten plastic material (6) and possibly the said complementary flow (6a) may be obtained by extrusion of at least one plastic material or by co-extrusion of at least two plastic materials, the said injection means comprising at least one extrusion machine, or a co-extrusion machine.

In particular, the said molten plastic material may include a colouring material.

The said molten plastic material may possibly include several layers, the said molten plastic material being obtained by co-extrusion, particularly so as to obtain particular decorative effects.

Furthermore, according to one embodiment, the nature or composition of the said flow of thermoplastic material may remain identical during the entire overmoulding process, such that the said deposit or the said external layer (80) has the same nature or composition over the entire height of the said overmoulded receptacle (8).

But according to another embodiment, the nature or composition of the said flow of thermoplastic material may be not identical throughout the overmoulding, such that the said deposit or the said external layer (80) is not the same over the entire height of the said overmoulded receptacle (8).

Another purpose of the invention is an overmoulding device (1) to implement the process according to the invention, designed to overmould a hollow receptacle (7) provided with an opening or a neck (70) and an axial body (71) typically comprising a shoulder (72), a sidewall (73) and a bottom (74), the said receptacle with axial height H and larger cross-section S typically being a receptacle or a glass flask.

This device may include:

a) a mould (2) in at least two parts, that can be opened/closed by displacement of at least one mobile part (20) of the said mould, so as to form an axial cavity (21) that can contain the said hollow receptacle (7) so that it can be overmoulded, b) a means (5) of injecting a molten thermoplastic material (6) through an injection duct (210) so as to obtain a so-called "overmoulded" receptacle (8) comprising a deposit or layer of the said plastic material (80) over all or part of the said axial body (71).

This device is characterised in that the said mould (2) comprises a lateral positioning means (3) to position the said hollow receptacle (7) in the said axial cavity (21), and typically a centring means, so as to obtain a predetermined thickness at all predetermined locations of the said axial body (71), for the said deposit or the said layer (80).

In this device, the said mould (2) may comprise an axial support part (4), the said axial support part (4) comprising or forming a means of masking the said opening or the said neck (70) during the said overmoulding, so as to obtain the said overmoulded receptacle (8) provided with a free neck (81), that can thus be closed off by a closing means.

Preferably, the said lateral positioning means (3) may be an automatic lateral positioning means (3').

Examples of such a means are shown in FIGS. 10a to 11a and in FIG. 15.

The said axial support part (4) of the device may be an axial support part called the "front" (4') including a recess (40) typically forming a blind hole (40') and capable of cooperating with the said neck (70) so as to mask the said neck (70) during the said overmoulding.

The said mobile part (20) of the said mould (2) may include a so-called "back" part (200), the said back part (200) including the said injection duct (210) and forming a back wall of the said cavity (21), such that the said flow of molten thermoplastic material (6) is injected into the part of the said axial cavity (21) close to the said bottom (74) during the said overmoulding.

As illustrated in FIGS. 13a and 13b, the said axial support part (4) may include an axial projection (41).

The said axial projection (41):

a) may be centred with respect to the said neck (70) or the said recess (40) or the blind hole (40'), b) may be a smaller section and typically a smaller diameter than the inside section or the inside diameter of the said neck (70), so as to be able to penetrate into the said receptacle when the said neck cooperates with the said recess, c) may have an axial length corresponding to the depth of the said hollow receptacle (7), so that the said axial projection (41) has a so-called back end (410) in contact with the said bottom (74) when the said neck (70) cooperates with the said recess (40), such that the flow of the said molten thermoplastic material applying an axial pressure on the said hollow receptacle (7) during the said overmoulding, the said axial pressure transmitted onto the said hollow receptacle (7) is partly transmitted through the said bottom (74) to the said axial projection (41), and partly transmitted through the said neck (70) to the said recess (40), such that the said neck applies a limited front axial pressure in contact with the said recess (40), thus limiting risks of failure of the said neck (70) or the said shoulder (72).

Preferably, the said lateral positioning means (3) may form an axially mobile part (3') that cooperates with the said axial support part (4).

In this device:

a) the said mobile part (3') may be a mobile tubular part (300) inside the said mould (2) along the said axial direction (22) and having the said section S on the inside, such that the said tubular part (300) can provide a predetermined positioning, and typically centring, of the said wall (73) of the said receptacle (7) in the said axial cavity (21), b) the said tubular part (300) may include a means of displacement (9), typically slaved to the said injection means (5) or to the said flow of molten thermoplastic material (6), such that the said tubular part (300) can be displaced forwards in the axial direction towards the said neck as the said flow (6) progresses, the said flow forming an annular layer (800) over all or part of the said wall (73), at least partially substituting for the said mobile part (300) and thus in turn assuring the said predetermined positioning or the said centring of the said wall (73) of the said receptacle (7) in the said cavity (21).

As illustrated in FIG. 13b, the said axial projection (41) may be a tubular axial projection (41') enabling injection or air circulation to achieve accelerated cooling of the said overmoulded receptacle (8).

The said axial projection (41) may be a projection (41") free to move in the axial direction with respect to the said axial support part (4), so as to facilitate and accelerate the said ejection of the said overmoulded receptacle (8).

As illustrated in FIG. 1a, the said mobile part (20) of the said mould (2) may comprise two lateral parts (201), these two lateral parts (201) form the sidewall of the mould (2) and are typically moved apart during ejection of the overmoulded receptacle (8).

EXAMPLE EMBODIMENTS

The Figures show example embodiments of the process and the device according to the invention.

ADVANTAGES OF THE INVENTION

The process and device according to the invention are used to overmould a large variety of hollow receptacles (7), particularly due to the presence in the mould of a positioning means (3), and typically an automatic positioning means.

Due to the means according to the invention, it is possible to:

obtain a wide variety of overmouldings covering all or part of the body (71) of the hollow receptacle (7), obtain this variety of overmouldings in a reproducible manner, obtain this variety of overmouldings at a high rate, particularly strongly limiting risks of breakage in the case of fragile glass receptacles.

The invention can thus be used to overmould glass receptacles made of thin glass.

Furthermore, the use of these means only requires modifications of tools in moulds, and therefore they are compatible with the use of standard moulding equipment so that there is no need for a large investment.

| List of marks | |
|---|---|
| Overmoulding device | 1 |
| Automation means | 10 |
| Means of opening/closing the mould | 11, 11' |
| Mould | 2 |
| Mobile part | 20 |
| Back part | 200 |
| Lateral part | 201 |
| Axial cavity | 21 |
| Injection duct | 210 |
| Axial direction | 22 |
| "Forwards" axial direction | 220 |
| "Backwards" axial direction | 221 |
| Second mobile part | 23 |
| Front parts | 24, 24' |
| Lateral positioning means | 3 |
| Automatic lateral positioning means | 3' |
| Axially mobile part | 30 |
| Mobile tubular part | 300 |
| Back end of 30, 300 | 301 |
| Axial support part | 4 |
| "Front" axial support part | 4' |
| Recess | 40 |
| Blind hole | 40' |
| Axial projection | 41 |
| Coaxial tube | 41' |
| Back end of 41 | 410 |
| Front wall of 21 | 42 |

-continued

List of marks

| Injection means | 5 |
|---|---|
| Extrusion machine | 50 |
| Flow of plastic material | 6 |
| Annular flow | 6' |
| Hollow receptacle | 7 |
| Opening or neck of 6 | 70 |
| Body of 7 | 71 |
| Shoulder of 71 | 72 |
| Sidewall | 73 |
| Bottom | 74 |
| Part of 73 with section S | 75 |
| Part of 73 with section < S | 76 |
| Front part | 760 |
| Back part | 761 |
| Projected tubular surface of 75 | 77 |
| Overmoulded receptacle | 8 |
| Layer - external overmoulding deposit | 80 |
| Annular layer - lateral deposit | 800 |
| Overmoulding bottom | 801 |
| Layer on shoulder | 802 |
| Recessed element or element in relief | 803 |
| Free neck | 81 |
| Complementary deposit | 82 |
| Axial displacement means of 3, 3', 30 | 9 |
| Spring | 90 |
| Hydraulic jack | 91 |

The invention claimed is:

1. A process for overmolding a hollow receptacle (7) having or a neck (70), and an axial body (71) including a shoulder (72), a sidewall (73) and a bottom (74), the hollow receptacle (7) having an axial height H and a maximum cross section S, comprising the steps of:

placing all or part of the hollow receptacle (7) into an open mold (2);

closing the mold (2) by moving at least a mobile part (20) of the mold (2) so as to form an axial cavity (21);

injecting a flow of molten thermoplastic material (6) into the axial cavity (21) by an injection means (5), through an injection duct (210) in the mold (2), so as to form a deposit (80) of the plastic material on the receptacle, and thus obtaining an overmolded receptacle (8); and opening the mold (2) after the deposit (80) has cooled; and ejecting the overmolded receptacle (8) from the mold (2), wherein, during the placing step, the neck (70) or the shoulder (72) is placed in contact with an axial support part (4) of the mold (2), the axial support part (4) includes a means of masking the neck (70) throughout the overmolding process, so that the overmolded receptacle (8) has a free neck (81) that can be closed off by a closing means, before the closing step, the sidewall (73) of the receptacle (7) is placed in a lateral positioning means (3) which is moveable along an axial direction (22) of the mold (2), during the injecting step, the material flow (6) forms an annular flow (6') that surrounds the sidewall (73) and displaces the lateral positioning means (3) in the axial direction of the axial cavity (21), so that the lateral positioning means (3) and the material flow advance forwards (220) in the axial direction to obtain the overmolded receptacle (8), and the overmolded receptacle (8) is ejected by movement of the lateral positioning means (3) backwards (221) along the axial direction to return the lateral positioning means (3) to an initial position in the mold (2) at the placing step.

2. The process according to claim 1, wherein the lateral positioning means (3) is an automatic lateral positioning means (3').

3. The process according to claim 1, wherein
the axial support part (4) is a front axial support part (4') with a recess(40) that forms a blind hole (40'), and
the blind hole (40') cooperates with the neck (70) so as to mask the neck (70) during the overmolding.

4. The process according to claim 1, wherein the mobile part (20) comprises a back part (200) with the injection duct (210) so that the deposit (80) is firstly formed on the bottom (74) of the receptacle (7).

5. The process according to claim 1, wherein
the axial support part (4) is a front axial support part (4') with a recess(40) that forms a blind hole (40') that cooperates with the neck (70) so as to mask the neck (70) during the overmolding,
the axial support part (4) comprises an axial projection (41, 41'),
the axial projection (41, 41') is centered with respect to one of the neck (70), the recess (40), and the blind hole (40'),
the axial projection (41, 41') is sized to penetrate into the hollow receptacle (7) when the neck (70) cooperates with the recess (40) or the blind hole (40'), and
the axial projection (41, 41') has an axial length that corresponds to the depth of the receptacle (7), so that the axial projection (41, 41') has a back end (410) in contact with the bottom (74) when the neck (70) cooperates with the recess (40) or the blind hole (40'), and
the flow of molten thermoplastic material (6) applies an axial pressure to the receptacle (7) during the overmolding which is transmitted to the axial support part (4), partly through the bottom (74) through the axial projection (41, 41'), and partly transmitted by the neck (70) or the shoulder (72), such that the neck or the shoulder applies a limited front axial pressure in contact with the axial support part (4) to reduce the risk of breakage of the neck (70) or the shoulder (72) during the overmolding.

6. The process according to claim 1, wherein the lateral positioning means (3) forms an axially mobile part (30) that cooperates with the axial support part (4).

7. The process according to claim 6, wherein,
the sidewall (73) of the receptacle (7) includes a part (75) with an axial height h equal to at least 0.1.H and a cross section that is equal to the maximum cross section S and constant over the axial height h, and a remaining part (76) with a cross section S', wherein S'<maximum cross section S,
the axially mobile part (30) includes a tubular part (300) with an inside cross section equal to the maximum cross section S,
the axially mobile part (3) is free to move inside the mold (2) along an axial direction such that the tubular part (300) assures predetermined positioning and centering of the sidewall (73) in the axial cavity (21),
the flow of thermoplastic material (6) into the cavity is released at the back of the mobile tubular part (300) such that an annular flow of thermoplastic material (6') will form an annular layer (800) from the deposit(80), and
the annular flow (6') moves the mobile tubular part (300) axially forwards in the direction of the neck (70) so that the annular flow (6') is progressively and at least partially substituted for the mobile part (300), and
the annular flow (6') enables the predetermined positioning or the centering of the sidewall (73) of the receptacle (7) in the axial cavity (21).

8. The process according to claim 7, wherein the height h of the part (75) with the maximum cross section S is a value such that the ratio h/H is from 0.15 to 0.85.

9. The process according to claim 7, wherein the part (75) with the maximum cross section S has a back end (750) at an axial distance H1 from the neck such that the distance H1 is equal to at least 0.3H, so as to assure the predetermined positioning or the centering of the sidewall (73) of the hollow receptacle (7) in the cavity (21).

10. The process according to claim 7, wherein the maximum cross section S has a shape selected from the group consisting of square, rectangular, triangular, circular and oval.

11. The process according to claim 10, wherein the maximum cross section S includes at least one concave portion.

12. The process according to claim 7, wherein the remaining part (76) has a front part (760) located entirely inside a tubular surface (77) projected in the axial direction which bears onto the part (75) with the maximum cross section S, so as to enable the axial displacement of the mobile part (30) or the mobile tubular part (300).

13. The process according to claim 12, wherein,
all or part of the axial support (4) has an outside with a cross section equal to the maximum cross section S of the part (75) of the hollow receptacle,
the mobile tubular part (300) has an inside with a cross section, and
all or part of the axial support (4) has approximately the same cross section on the outside as the inside of the mobile tubular part (300) such that there is a mechanical link between the axial support part (4) and the mobile tubular part (300) so that the mobile tubular part (300) can slide coaxially with respect to the axial support part (4).

14. The process according to claim 7, wherein the mobile part (30) has a front part (301) cooperating at its front end (302) with an axial displacement means (9).

15. The process according to claim 14, wherein,
the axial displacement means (9) comprises a helical spring (90) to control backwards axial displacement of the mobile tubular part (300) when the mold (2) is opened, and
the flow of thermoplastic material (6) exerts a sufficient axial pressure against the mobile tubular part (300) to prevent displacement by the spring (90) and to move the mobile tubular part (300) forwards during the overmolding.

16. The process according to claim 14, wherein,
the axial displacement means (9) comprises an auxiliary displacement means to control axial translation,
the auxiliary displacement means is one of a hydraulic jack (91) controlling axial translation and an electric motor provided with a rack that transforms a rotation movement into an axial translation of the mobile tubular part with a rod cooperating with the front end (302) of the mobile part (30).

17. The process according to claim 16, wherein the axial displacement means (9) is slaved to the injection means (5) such that the mobile part (30) or the mobile tubular part (300) is pushed and moved forwards as the flow (6, 6') progresses in the cavity during overmolding of the part (75) with the maximum cross section S.

18. The process according to claim 13, wherein,
the axial support part (4) is a front axial support part (4') with a recess (40) that forms a blind hole (40') that cooperates with the neck (70) so as to mask the neck (70) during the overmolding, and
the axial support part (4, 4') has a front molding surface that forms a front wall (42) of the cavity (21) so as to achieve overmolding of the front part (760) of the wall (73) with a cross section S', wherein S'<maximum cross section S, and optional overmolding of the shoulder (72).

19. The process according to claim 7, wherein, the remaining part (76) has a back part (761) entirely located inside the projected tubular surface (77) of the maximum cross section S.

20. The process according to claim 19, wherein, the mobile part (20) or the back part (200) including the injection duct (210) forms a back molding surface which forms a back part of the cavity so as to overmold all or part of the back part (761) of the sidewall (73), and optionally overmolding all or part of the bottom (74) of the hollow receptacle (7).

21. The process according to claim 1, wherein,
at the end of overmolding, the mobile part (20), the back part (200) and/or the lateral part (201) of the mold (2) is replaced by a second mobile part (23) of the mold (2) in order to achieve complementary overmolding by a complementary flow (6a) of thermoplastic material, and
the complementary flow (6a) forms a complementary deposit (82) of thermoplastic material, fixed to the overmolding bottom (801), the complementary deposit (82) having a cross section S", optionally, S">maximum cross section S.

22. The process according to claim 7, wherein, before ejecting, the mobile tubular part (300) is displaced backwards in the axial direction towards the bottom (74), so as to enable or facilitate ejection of the overmolded receptacle (8).

23. The process according to claim 1, wherein the axial height H varies from 40 mm to 90 mm.

24. The process according to claim 1, wherein the maximum cross-section S varies from 500 $mm^2$ to 2500 $mm^2$.

25. The process according to claim 1, wherein the hollow receptacle (7) is a glass receptacle intended to contain a cosmetic product.

26. The process according to claim 1, wherein the thermoplastic material is a transparent or translucid thermoplastic material selected from the group consisting of ionomer resins, PP, polyesters, and elastomers.

27. The process according to claim 1, wherein thermoplastic material is an elastomer which is a soft plastic material with a Shore A hardness varying from 15 to 77.

28. The process according to claim 1, wherein,
flow of molten thermoplastic material of the injecting step is obtained by extrusion of at least one plastic material or by co-extrusion of at least two plastic materials, and
the injection means comprises at least one extrusion machine, or a co-extrusion machine.

29. The process according to claim 1, wherein the molten thermoplastic material includes a coloring material.

30. The process according to claim 1, wherein the molten thermoplastic material comprises several layers obtained by co-extrusion.

31. The process according to claim 1, wherein, the nature or composition of the flow of thermoplastic material remains identical during the entire overmolding process, such that the deposit or (80) has the same nature or composition over the entire height of the overmolded receptacle (8).

32. The process according to claim 1, wherein, the nature or composition of the flow of thermoplastic material is not identical throughout the overmolding, such that the nature or composition of the deposit (80) is not the same over the entire height of the overmolded receptacle (8).

* * * * *